(No Model.) 2 Sheets—Sheet 1.
R. S. PEASE.
MANUFACTURE OF GLASS PLATES.
No. 463,643. Patented Nov. 24, 1891.
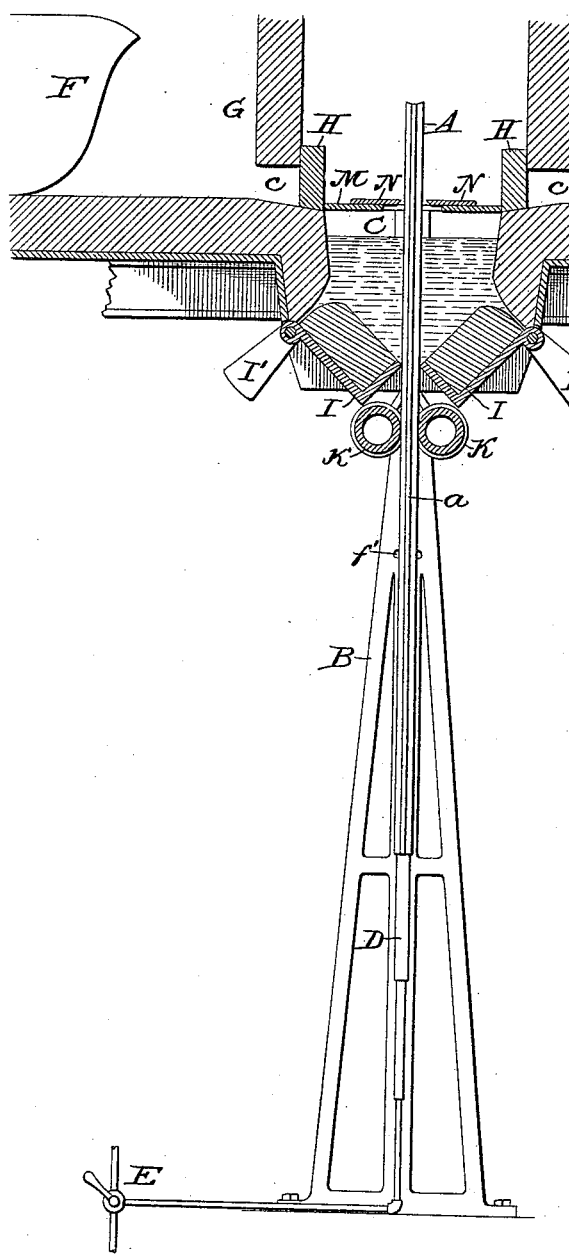
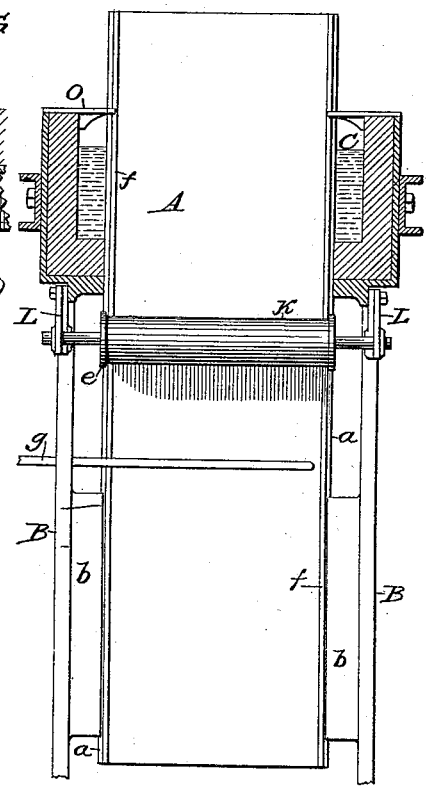
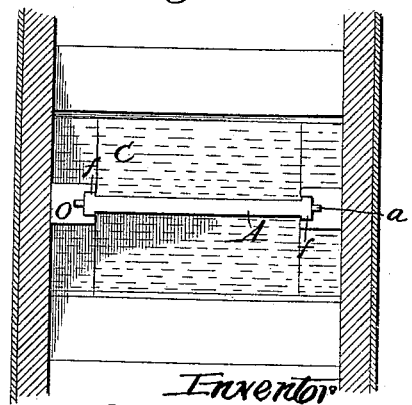
Witness
James F. Duhamel
Horace A. Dodge
Inventor
ROGER S. PEASE,
by Dodge & Son,
Attys.

(No Model.) 2 Sheets—Sheet 2.
R. S. PEASE.
MANUFACTURE OF GLASS PLATES.
No. 463,643. Patented Nov. 24, 1891.
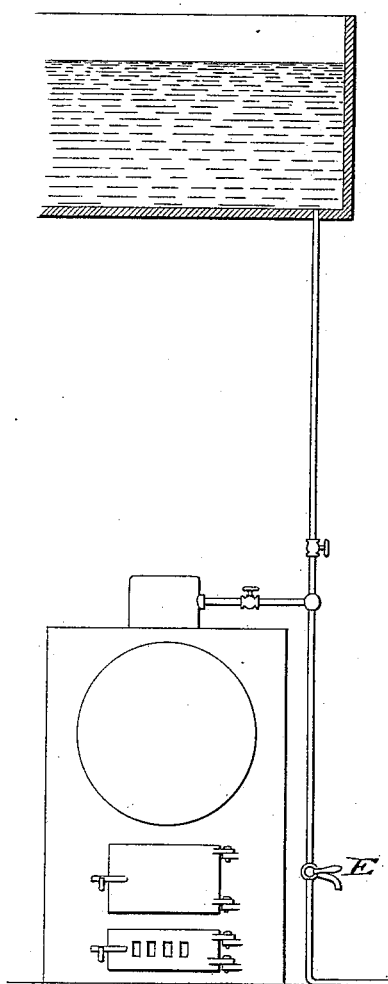
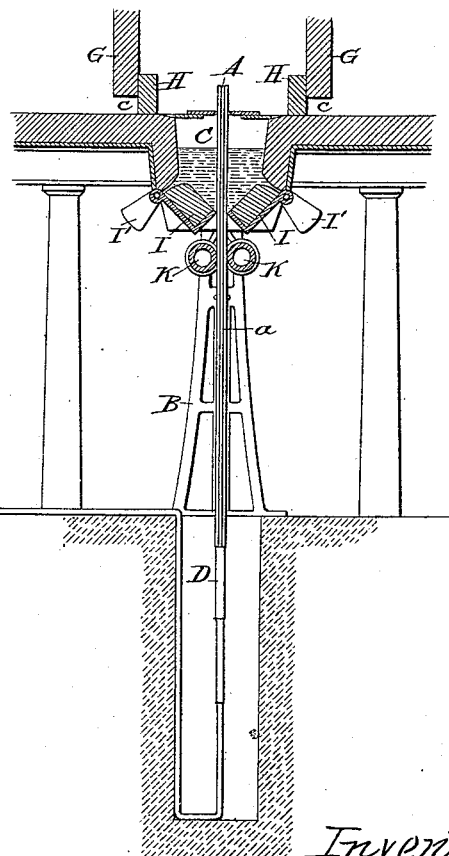
Fig. 4.
Witness:
James F. Duhamel
Horace A. Dodge.
Inventor
ROGER S. PEASE,
by Dodge & Sons,
Attys.

UNITED STATES PATENT OFFICE.

ROGER S. PEASE, OF ROSE, ASSIGNOR OF ONE-HALF TO COURTLANDT BABCOCK AND AMBROSE B. EVERTS, OF MINNEAPOLIS, MINNESOTA.

MANUFACTURE OF GLASS PLATES.

SPECIFICATION forming part of Letters Patent No. 463,643, dated November 24, 1891.

Application filed February 24, 1891. Serial No. 382,564. (No model.)

*To all whom it may concern:*

Be it known that I, ROGER S. PEASE, a citizen of the United States, residing at Rose, in the county of Ramsey and State of Minnesota, having my place of business and post-office address at Minneapolis, Minnesota, have invented certain new and useful Improvements in the Manufacture of Glass Plates, of which the following is a specification.

This invention relates to the manufacture of glass plates, sheets, and films, and contemplates the making thereof in different colors or combinations of colors.

The invention is in the nature of an improvement upon or a further development of a prior invention made by me, and set forth in Letters Patent No. 444,560, dated January 13, 1891. In the former plan the slide or plunger was arranged to move upward through the molten metal contained within a tank or receptacle and to carry upward on its exterior a film or films of glass, which were severed from the metal in the tank or receptacle and removed from the plunger and subsequently annealed. This feature is retained under the present plan; but I double the capacity of the apparatus by arranging the plunger to draw down with it in passing downward two additional films or sheets, which are acted upon by rollers and rolled to the proper thickness and made uniform, the rollers being made to serve also to chill or set the glass, if found necessary, as may be the slide where the sheets are of considerable thickness. I also propose in some cases to figure the rollers so as to produce figured or roughened glass.

In the accompanying drawings, Figure 1 represents in vertical section so much of a glass-making apparatus as is necessary to a thorough comprehension of the present invention; Fig. 2, a transverse sectional view of the same; Fig. 3, a horizontal sectional view showing the manner in which the plunger passes upward through the glass-containing receptacle, and is guided in its movements; Fig. 4, an outline view or diagram illustrating the arrangement for elevating the plunger by means of fluid-pressure or elevating and heating the plunger by steam or other heated fluid.

In said drawings, A indicates a plunger adapted and arranged to move vertically, its edges being provided with guiding-ribs $a$, which move and are guided in grooved blocks or brackets $b$, projecting from a frame-work B, of metal or other suitable material, which serves the double purpose of carrying the guides and of sustaining or partially sustaining the metal-containing receptacle C, through which the plunger moves.

The vertical movements of the plunger may be effected by any suitable hoisting apparatus—such, for instance, as is set forth in the patent above referred to; but I prefer to employ a hydraulic lifting apparatus consisting simply of a pipe or pipes D, connected with a suitable elevated tank or receptacle, as shown in Fig. 4, which is supplied by pumps or a a natural head in the ordinary manner, and which pipe, being carried upward into the hollow plunger A, delivers the water thereto with sufficient head or pressure to cause the rise of the plunger.

The delivery of water to the plunger and the discharge thereof through the pipe D is controlled by a three-way valve E, or in any other convenient manner, the rate of rise and fall of the plunger being controlled by the extent to which said valve is opened to the receiving or discharging port. The water thus introduced into the plunger serves the double purpose of controlling its movements and cooling the plunger, so that no other or special provision for the latter purpose is necessary. The pipe or pipes D will be surrounded by a suitable packing gland or glands to prevent leakage.

C indicates a receptacle for molten metal, which is preferably delivered thereto from pots or crucibles F, contained in a chamber or chambers G at the side or sides of the said receptacle C.

In practice the receptacle C may be supplied from a tank or tanks or from melting-furnaces entirely separate from the apparatus herein represented; but I prefer to make use of the pots or crucibles herein indicated, because I am enabled thereby to deliver molten metal directly from the pots without removing the pots from the furnace, and thereby to avoid the difficulties which attend the use of tanks or the employment of removable pots, which require to be taken from the heating or melting chamber and carried to the receptacle in which the glass is to be used.

In Fig. 1 I have represented the pots F as arranged in chambers G, located on opposite sides of the receptacle C, it being the intention to heat the chambers G by mingled air and gas from regenerative furnaces, of the Siemens type by preference, though other provision may be made for heating them, if desired. Except when the pots are being emptied the openings c through the walls of the chambers G are closed by blocks H of fire-clay or by any other convenient means.

The bottom of the receptacle is formed by hinged gates or sections I, which are counter-weighted, as shown, to hold them normally closed against the faces of the plunger A, the gates or sections I being backed with iron or other suitable metal, and said backings being brought to a sharp angular edge where they bear against the plunger A, for a purpose hereinafter explained. The counter-weights I' may be made as heavy as desired, and should in any case be sufficient to hold the gates in contact with the plunger A, notwithstanding a full charge or supply of molten metal be contained within the receptacle C. The metal in the receptacle C is to be permitted to cool therein sufficiently to bring it to the proper consistency for advantageous working, the consistency being determined in some degree by the thickness of the sheet or film desired; but the condition of the surrounding atmosphere and the degree to which the plunger A is cooled are circumstances which are also to be taken into consideration in determining this point.

While I have represented pots F for supplying molten metal to the receptacle C, and while I prefer the pots because of the difficulty of delivering molten metal to such a receptacle from a tank and properly closing the passages through which the molten metal flows, and because of the opportunity afforded of supplying glass to receptacle C in different conditions, qualities, or colors, it is to be understood that tanks may be used instead of the pots F.

K K indicate two rollers, which are carried by hangers or pendulous bars L L, suspended from studs or pivots d, which I prefer to arrange in line with the axis of the plunger A, but which will be located at such point or points as to cause the rollers to bear with proper force against the side faces of the plunger A, as indicated in Figs. 1 and 2. If desired, the pivots may be made adjustable with reference to the plane of movement of the plunger, so as to vary the force or pressure with which they bear against the roller or against the films or layers of glass which are brought down by the plunger, as hereinafter explained.

In order that the rollers may be prevented from shifting longitudinally and to insure the retention of the glass films or layers within the proper limits laterally, the rollers K are provided with flanges e at their ends, which flanges work in close contact with or proximity to the edges of the plunger A.

The upright framing B is provided with two openings f at each side, which are designed to receive rods of bass-wood or other suitable material, and to hold the same in close contact with the faces of the plunger A for the purpose of stripping therefrom the layers or sheets of glass brought down thereby.

The apparatus being thus constructed, the operation is as follows: The plunger A is drawn downward until its upper end is below the upper surface or level of the molten metal within the receptacle C, its motion being then reversed so that a body of metal is carried upward across its top, resting in the semicircular or depressed seat therein, as shown in Fig. 1, and extending downward on the sides of the plunger to the molten metal. The thickness of the sheet, film, or body lying upon the face of the plunger will depend upon the extent to which the plunger is cooled, the condition of the surrounding atmosphere and the consistency of the metal in the receptacle C, these matters being subject to the control and in some measure depending upon the judgment of the attendant. When the plunger is carried as high as is necessary to produce sheets or films of the desired length, its motion is stopped, or is suddenly accelerated for a short distance to permit the cutting or to cause the severance of the film or sheet produced. The sheets or films being properly removed from the elevated plunger, the motion of said plunger is reversed and a slight opening of the gates I is permitted, which may be regulated and determined in any convenient manner, the plunger carrying downward with it on its faces sheets or films of the molten metal, which, following the plunger, pass between said plunger and the rollers K K, which roll out the metal to a proper and uniform thickness, and may, if desired, impart any suitable figuring or marking to the plates so produced. To permit the plates thus formed to properly cool on both faces, it is deemed desirable to strip them from the face of the plunger A, and it is for this purpose that the bass-wood strips g are inserted into the openings f.

The receptacle C may be provided with adjustable or removable covers M, by which to retain the heat therein or determine the rate or degree of cooling of the molten metal. Cutting-plates N may be arranged upon these covers for cutting the glass films or plates and severing them from the molten metal, or from that portion of the film connecting them with the molten metal.

It is of course to be understood that the receptacle C is intended to contain only a limited quantity of glass, and that it is made of comparatively small capacity, the intention being to pour from the pots or to run a fresh supply from the tanks into the receptacle at each drawing or after a few drawings.

As above mentioned, the metal backings of the gates I are brought to a sharp edge where they bear against the plunger A. This construction causes them to make a close joint with the plunger, preventing the escape of molten metal as the plunger rises, and to scrape off any adhering matter that may lie upon the face of the plunger as the latter ascends. When opened to permit the flow of metal downward with the plunger, these edges serve as gages to determine the thickness of the body flowing from the receptacle and to render the surface even and uniform. When the sheets or films have been drawn downward to the proper length, the gates I are thrown upward and against the plunger I, so as to sever the sheets or films and prevent the further escape of the molten metal. In this way the sheets are manufactured with great rapidity, two being formed on each upward stroke and two others on each downward stroke of the plunger.

The plunger or slide is arranged to travel clear of the walls of receptacle C, and the molten or plastic glass is scraped from the edges of the plunger by scrapers O as the plunger rises and by the metal backing of the oven bottom or floor as the plunger descends. The plunger will be formed with longitudinal side ribs $f$ to gage and determine the thickness of the glass formed on the downstroke, or the rollers K K may be formed with narrow bearing collars at or near their ends for a like purpose. When the side ribs $f$ are employed, the bottom of the chamber G and its backing will be of a width or length to enter between the side ribs, and consequently to come into contact with the faces of the slide or plunger.

While I have proposed to introduce water into the plunger and to cool the same, I may introduce steam instead and utilize the same to heat and to elevate the plunger. So, too, the rollers K K may be heated or cooled, as required. The cross-section of the plunger may be varied as desired. The plunger, by reason of its movement through the molten metal, becomes in a short time highly heated, and, in fact, so much so as to cause the glass to adhere and be taken up in too thick a body, and to guard against this contingency I proposed in my former patent and arrange in the present instance to cool the plunger; but in starting the apparatus, the plunger being cold, the film drawn up is liable to be quite thin, and to avoid its being made too thin I provide for heating the plunger, for which purpose the same pipes or apparatus provided for cooling may be made use of, but merely connected with a different source of supply—as, for instance, the steam-generator indicated in Fig. 4.

Having thus described my invention, what I claim is—

1. The herein-described method of producing glass films or sheets, which consists in causing a plunger to move upward through a body of molten metal and thereby to carry upward upon its surface a film or layer, removing the same, then reversing the movement of the plunger and causing a second film or layer to be carried downward through the bottom of the receptacle by said plunger, substantially as set forth.

2. The herein-described method of producing sheets or films of glass, which consists in moving a plunger downward through an opening in a receptacle containing molten metal, and thereby drawing from the molten metal a film or sheet upon the surface of the plunger.

3. The herein-described method of making films and sheets of glass, which consists in moving a plunger downward through an opening in the bottom of a receptacle containing molten metal and thence between rollers, whereby a film or sheet of glass is formed upon and carried downward by the plunger and reduced to the proper thickness between the rollers and plunger, substantially as set forth.

4. In combination with a receptacle adapted to contain molten metal, a plunger movable upward and downward through the same, and gates or sections constituting the bottom of said receptacle and adapted to bear against the sides of the plunger or to be moved outward therefrom at will.

5. In combination with a receptacle adapted to contain molten metal, a plunger movable upward and downward through the same, gates or sections constituting the bottom of said receptacle and adapted to be thrown into and out of contact with the plunger at will, and rollers located below said receptacle and adapted to be moved into and out of contact with the face of the plunger, substantially as and for the purpose explained.

6. In combination with receptacle C, adapted to contain molten metal, plunger A, movable through said chamber, and counterweighted gates I, bearing against the faces of the plunger and constituting the bottom of the receptacle, substantially as shown and described.

7. In combination with a receptacle adapted to contain molten metal, and with a plunger movable vertically through the same, a pipe or pipes extending upward within the plunger and connected with a supply of fluid under pressure, the plunger being closed against the escape of fluid, substantially as described, whereby the inlet and exit of fluid through the pipe are caused to raise and lower the plunger.

8. In combination with receptacle C and plunger A, movable through the same, pipe D, connected with a pressure tank or supply, a three-way valve E, adapted to permit and control the inlet and exit of water or fluid.

In witness whereof I hereunto set my hand in the presence of two witnesses.

ROGER S. PEASE.

Witnesses:
WALTER S. DODGE,
WILLIAM W. DODGE.